United States Patent [19]

Wolfrum

[11] 4,242,225
[45] Dec. 30, 1980

[54] METHOD AND APPARATUS FOR PRODUCING ACTIVE COKE

[76] Inventor: Erhard Wolfrum, Neue Aue 6, 5160 Düren (Rheinland), Fed. Rep. of Germany

[21] Appl. No.: 14,774

[22] Filed: Feb. 22, 1979

[30] Foreign Application Priority Data

Mar. 2, 1978 [DE] Fed. Rep. of Germany ....... 2808995

[51] Int. Cl.³ .............. B01J 37/08; C10B 31/10; C10B 49/04
[52] U.S. Cl. ................ 252/411 R; 201/27; 201/31; 201/32; 201/38; 252/420; 252/421
[58] Field of Search ........... 252/410, 411, 417, 420, 252/421; 201/27, 31, 41, 34, 36, 37, 38, 32

[56] References Cited

U.S. PATENT DOCUMENTS

| | | | |
|---|---|---|---|
| 1,923,918 | 8/1933 | Davis et al. | 201/31 X |
| 3,434,932 | 3/1969 | Mansfield | 201/27 |
| 3,448,012 | 6/1969 | Allred | 201/27 |
| 3,565,827 | 2/1971 | Friday | 252/421 X |
| 3,791,994 | 2/1974 | Wenzel et al. | 252/421 |
| 3,870,652 | 3/1975 | Whitten et al. | 252/421 |
| 3,904,549 | 9/1975 | Barton et al. | 252/421 X |
| 3,994,829 | 11/1976 | Alford | 252/421 |
| 4,017,422 | 4/1977 | Gappa et al. | 252/417 |
| 4,115,317 | 9/1978 | Spater | 252/421 X |
| 4,148,752 | 4/1979 | Burger et al. | 252/421 |

*Primary Examiner*—Frank W. Lutter
*Assistant Examiner*—Roger F. Phillips
*Attorney, Agent, or Firm*—Steele, Gould & Fried

[57] ABSTRACT

At least a portion of coke produced in a hearth-type furnace is fed into an activation reactor, and at least a portion of the waste gas from the hearth-type furnace is fed to the activation reactor to act as a heating gas and/or an activation gas for the coke feed. Hot waste gas from the activation reactor is passed to a waste-heat boiler. Active coke which has at least partially lost its adsorption capacity may be fed into the furnace in mixture with the coal or alone, or it may be fed directly into the activation reactor for re-activation of the coke.

10 Claims, 2 Drawing Figures

METHOD AND APPARATUS FOR PRODUCING ACTIVE COKE

BACKGROUND OF THE INVENTION

German patent specification No. 20 24 210 discloses a method of producing active coke by thermal treatment of coal, wherein raw brown coal or lignite is treated after drying in a vacuum shaft coker, the treatment being effected, in at least one of the method steps, at a reduced pressure of less than 1 Torr. This method indeed produces a usable active coke, but it cannot generally be carried out with sufficient cost-effectiveness that the active coke which is produced thereby can be economically used for all uses which are technically possible. Furthermore, this method is not suitable for re-activating coke whose adsorption capacity has been partly or totally exhausted by virtue of the coke having adsorbed substances to be so treated, such coke being referred to herein as charged coke, and in practice, the method must be specifically adapted to the production of active coke, in respect of all its method steps.

SUMMARY OF THE INVENTION

An object of the invention is to provide a method and apparatus for producing active coke, without the above-discussed disadvantages.

A further object of the invention is to provide such a method which has greater cost-effectiveness, in particular in relation to energy consumption.

Another object of the invention is for the energy produced in the individual method steps to be used as extensively as possible, irrespective of the form in which it occurs, so that no, or only a small amount of additional energy has to be supplied from outside.

Yet another object of the invention is to provide a method which makes it possible for charged adsorption coke to be re-activated, also substantially utilising the energy which is already available within the overall method.

These and other objects are achieved by a method and apparatus wherein the coal is first coked in a hearth-type furnace and at least a portion of the resulting coke with the desired grain size is passed into an activation reactor. At least a portion of the waste gases from the furnace is also passed into the activation reactor as an activation gas and/or a heating gas in regard to the coke. The hot waste gases from the activation reactor are passed into a waste-heat boiler. Operation is preferably such that the coke from the furnace is passed into the activation reactor without intermediate cooling, which provides for optimum utilisation of the perceptible heat contained in the coke, which the coke brings with it from the furnace.

Preferably the activated coke from the activation reactor and/or the portion of coke which is not treated in the activation reactor is cooled, the vapour which is produced in this operation and which may contain quantities of dust being used in the waste-heat boiler. It is also possible to utilise any residual waste gases which may occur, from the hearth-type furnace, in the waste-heat boiler.

If brown coal is supplied to the hearth-type furnace, this is advantageously generally first dried to a residual water content of from 10 to 15%. The result of this is that the waste gases from the furnace have a water vapour content of about 25% by volume. This water vapour content is generally sufficient for activation of the coke which is to be treated in the activation reactor, especially as the hearth-type furnace waste gases normally also contain $CO_2$, of the order of magnitude of 10% by volume. It may also be possible however for portions of the vapour produced in the waste-heat boiler to be used for adjusting the activation gas, if such adjustment is required.

In accordance with an advantageous form of the method according to the invention, it is possible for charged active coke to be introduced additionally into the hearth-type furnace for re-activation; the coke is passed from the furnace into the activation reactor in the usual way, together with the coke which is produced at the same time in the furnace from coal, for further treatment in the activation reactor. It is also possible however for charged active coke additionally to be introduced into the activation reactor directly, that is to say, missing out the hearth-type furnace, for re-activation purposes. The choice between these two possibilities depends on a number of factors. It will be appreciated that in the majority of cases it will probably be more desirable for the charged active coke to be introduced directly into the furnace as the latter has particularly suitable conditions for the reactivation operation which at the same time involves removal of the charge substances on the coke. This greater suitability of the conditions in the furnace is in particular because the furnace is heated directly by combustion of the gases produced during the residence time of the material which is introduced into the furnace, predominantly by degasification of the material, but in a smaller proportion also by vaporisation. In the result, this is a kind of low-temperature carbonisation process. The substances which form the charge on the active coke to be re-activated are also treated in this way, the relatively high temperatures, of the order of magnitude of for example 1100° to 1300° C., in the hearth-type furnace ensuring that any gaseous products which are produced in the furnace, and therefore also those which originate from the charge material on the coke, are cracked so that the final result is a gas mixture which is still combustible and which essentially contains CO, $CO_2$ and $H_2$ so that the flue gas which is produced when this gas mixture is burnt is free from environmentally polluting components as it virtually contains only $CO_2$ and water vapour. A comparatively long residence time of the material in the hearth-type furnace, for example up to 60 minutes or even longer, also contributes to this.

If the hearth-type furnace is charged exclusively with active coke to be re-activated, the charge on the coke would normally not suffice to cover the heat requirement of the furnace. Consequently, if no additional heat is to be applied to the furnace from the outside, it will be necessary to introduce a mixture of brown coal and charged active coke for re-activation. Nonetheless, the possibility of re-activation will markedly increase the economic viability of the method, as the price which can be obtained for the re-activated coke is generally higher than the price that can be obtained when the charged active coke is simply used, as was previously usual, as a fuel. A very large number of noxious polluting substances such as phenols, dyes, foul-smelling substances and organic intermediate products can be eliminated in this way, without increased expenditure. Only those active cokes whose charge thereon includes high levels of concentration of sulphur, $NO_2$, halogens or other substances which form noxious residues when burnt, cannot be readily treated in the above-described manner, unless the waste gases from the hearth-type furnace are subjected to a cleansing process to remove such residues.

Introducing the charged active coke directly into the activation reactor, that is to say, without previous thermal treatment in the hearth-type furnace, can be considered if the temperature in the activation reactor, the average of which will normally be of the order of magnitude of 850° C., is sufficient to remove the substances which form the charge on the coke, by low-temperature carbonisation or by reaction with the activation agents. With the waste-heat boiler disposed downstream thereof, the gaseous products, insofar as they are combustible, can also be utilized here. Irrespective of whether the material introduced into the hearth-type furnace is exclusively coal or a mixture of coal and charged coke, the method according to the invention is generally speaking distinguished in that, by virtue of the synchronised mode of operation as between the hearth-type furnace and the activation reactor with the associated equipment disposed downstream thereof, all the energy which is produced in such operation, whether in the form of perceptible heat or in the form of chemical energy, is put to optimum use; in addition the separation of the actual coking apparatus, that is to say, the hearth-type furnace on the one hand, and the activation reactor on the other hand, makes it possible for both parts of the apparatus to be operated in such a way that each part provides the optimum result. Another substantial advantage of the method of the invention is its flexibility, for example in regard to the possibility of performing the method for the purpose of re-activating active coke which has already been charged, although the method is not linked solely to the presence of charged active coke. On the contrary, the method can also be performed when only coal is used as the feed material. Another possibility is for the apparatus which substantially comprises the hearth-type furnace, the activation reactor and the waste-heat boiler, to have associated therewith a device for producing coke eg in pellet-like or briquette-like form, which can then be passed directly into the activation reactor. The pellet-like or briquette-like coke can be made with or without the use of binding agents by pelleting or briquetting fine-grained coal with subsequent coking. It is also possible for the fine-grained coal to be coked first and for the briquettes or pellets to be produced from the coke.

The activation reactor can be arranged to be heated directly or indirectly. When it is heated directly, the coke can be activated in a fluidised bed, in which case the activation agent can be used at the same time as a fluidising agent and as a heating agent.

DESCRIPTION OF THE PREFERRED EMBODIMENT

Figure 1:
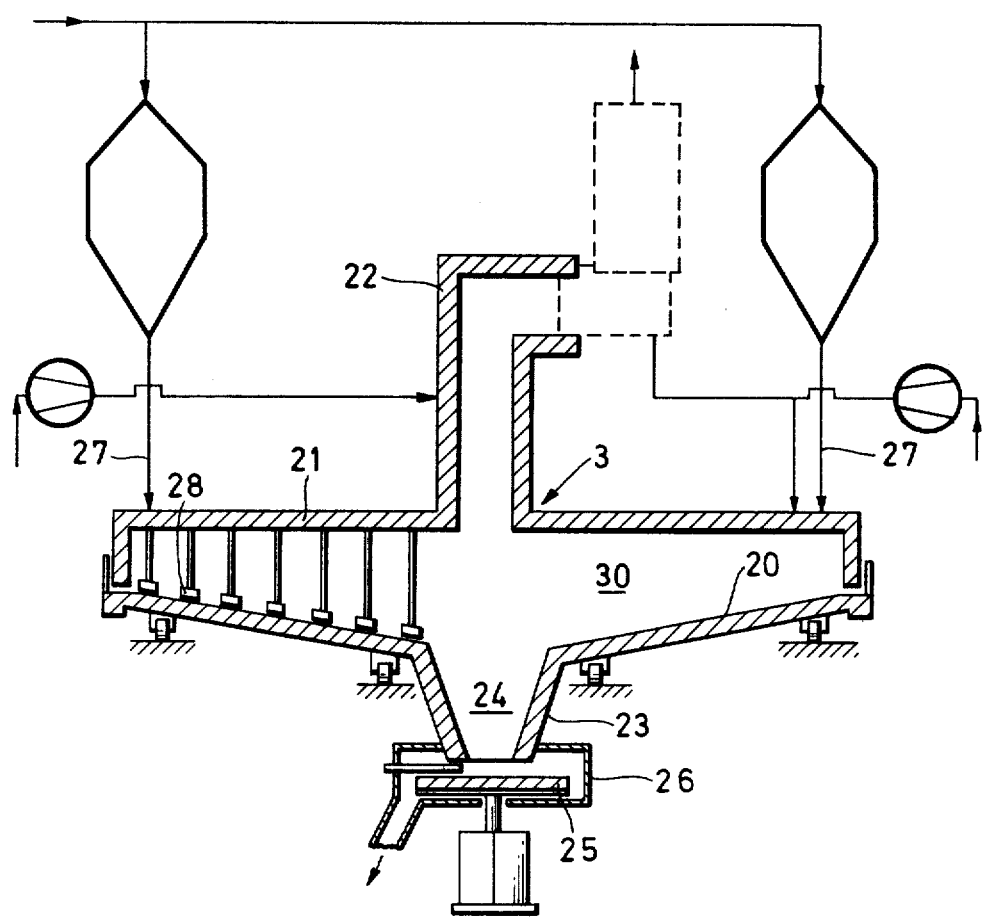
FIG. 1 shows one form of basic structure of a hearth-type furnace.

Referring first to FIG. 1, the hearth-type furnace 3 essentially comprises an annular hearth plate 20 which is mounted for rotary movement about a vertical central axis, and a stationary hood 21 which is arranged above the hearth plate 20 and which is provided with an outlet duct 22 for flue gas.

The annular hearth plate 20 is of a funnel-like tapered configuration and in its central region is provided on its underside with a downward extension portion 23 which defines a discharge shaft 24 through which coke from the furnace 3 is discharged on to a rotary plate member 25 arranged rotatably below the discharge shaft 24. The coke is moved radially outwardly on the plate member 25 by a stripper means and passes into a housing 26 from which it is then fed to further treatment stations, by any form of suitable means.

The material to be treated in the hearth-type furnace 3 is supplied thereto by way of one or more supply or feed means 27 which feed the material on to the outer edge portion of the hearth plate 20. The height of the layer of material, for example brown coal, on the plate 20, can be for example 150 mm.

Advantageously, stationary material-turning blades 28 are disposed within the furnace 3 above the hearth plate 20. The blades 28 turn over the layer of material on the hearth plate 20, for example after the plate 20 has performed a complete revolution or half a revolution, and thereby displace the material on the plate 20 over a given distance inwardly towards the discharge shaft 24. In this way the coal or coal-and-coke mix which is fed on to the edge of the plate 20 reaches the discharge shaft 24 after the plate 20 has performed a given number of revolutions. By suitably adapting to each other the speed of rotation of the plate 20 and the distance by which the coal or coal-and-coke mix is moved towards the shaft 24 in each material-turning operation, the residence time of the material within the furnace 3 can be determined and adapted to the respective requirements. In addition the material can also remain for a given period within the discharge shaft 24, this period of time in turn depending on the speed at which the plate 25 rotates.

The apparatus is brought into operation by the temperature within the furnace being raised to for example 600° C. by oil burners or other suitable auxiliary heating means. In the course of this operation of initial heating of the material which is on the plate 20, gases are liberated from the material and are burnt within the hearth chamber 30. The air required for such combustion is supplied by suitable means such as nozzles. Combustion of the gases causes an additional heating effect in the hearth chamber 30 until the required temperature, for example 1300° C., in respect of the waste gases is achieved. The waste gases are discharged from the chamber 30 through the outlet duct 22. As time passes, correspondingly high furnace lining brickwork temperatures occur as a result of convection and heat radiation, for example 800° C. at the outer edge of the plate 20 and about 1200° C. in the region of the discharge. At such temperatures the furnace has attained the required operating conditions so that the additional firing by means of the oil burners or the like can now be terminated. Heat is now supplied in normal operation solely by combustion of the distillation products which are liberated from the coal or coal-and-coke feed mix at these temperatures. Generally, combustion of a portion of this gas is sufficient to meet the heat required for operation of the furnace, if the material introduced into the furnace has a suitably large number of volatile constituents.

The heat produced by combustion of the gases is transmitted by radiation of the furnace cover and side walls to the coal or coal-and-coke feed fill and in this way provides for heating the material which is continuously supplied to the hearth plate, and thus for maintaining a continuous heat treatment process whose temperature can be kept constant within certain limits.

Figure 2:
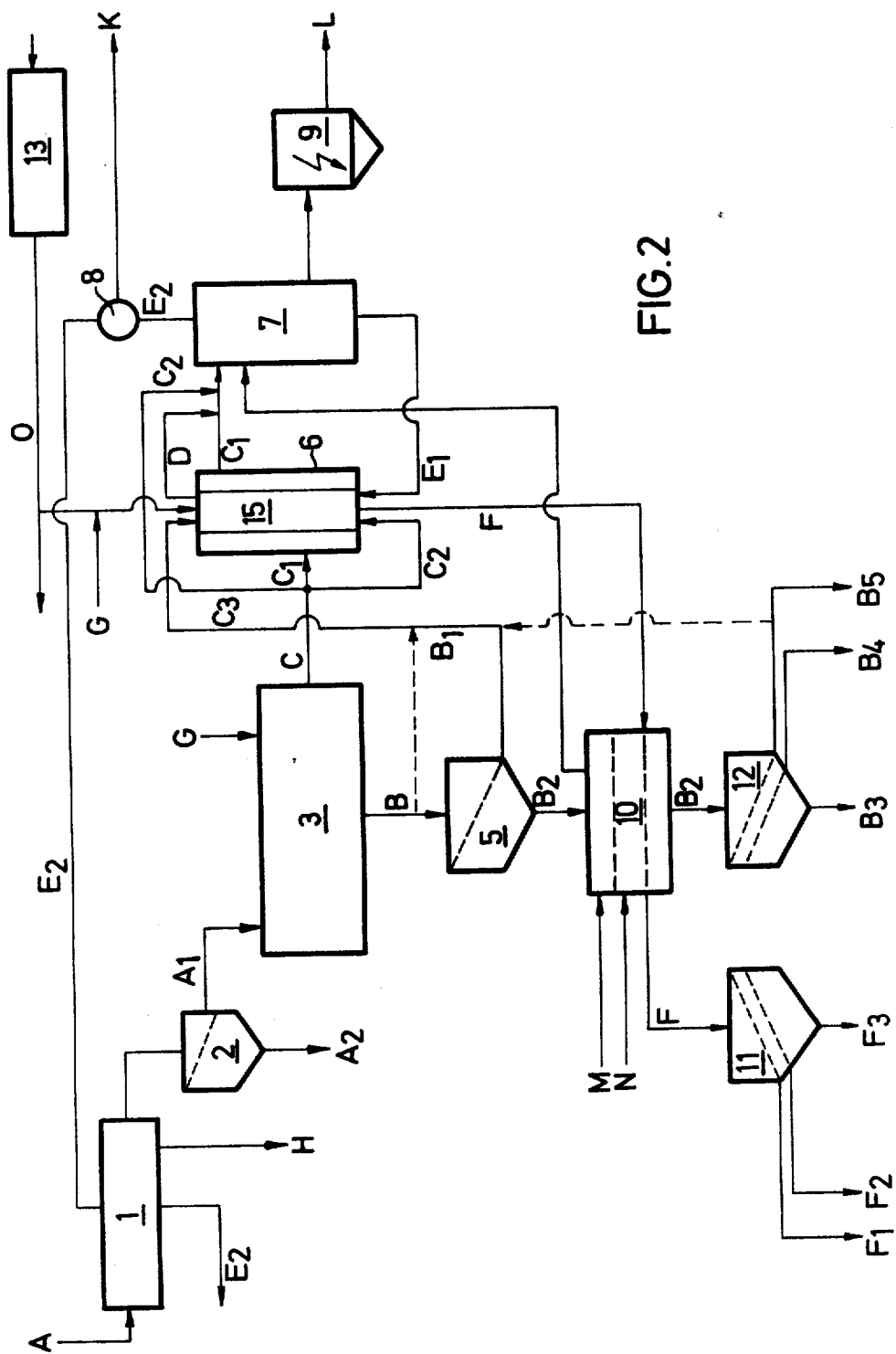
FIG. 2 shows a flow diagram of apparatus for producing active coke from brown coal or lignite.

Referring now to FIG. 2, crude coal A, eg brown coal, which has a moisture content of up to 60% and a grain size of preferably around 0 to 10 mm is firstly supplied to a drier 1 where it is dried until it has a residual water content of about 12%. The resulting vapours H are removed from the drier 1. The dried coal passes into a grading device 2 in which fine grain coal A2 with a grain size of for example less than 1 mm is screened out and removed. The remaining fraction A1, that is to say, coal which passes over the screen in the device 2, passes into the hearth-type furnace 3 as described above and whose structure and mode of operation are also described in 'Braunkohle', issue 11, November 1975, page 352 to which further reference may also be made for completeness. The coke furnace gas which is liberated in the course of the coking process which occurs in the hearth-type furnace 3 is used for heating the furnace. This is effected by complete or partial combustion of this gas in the region above the slowly rotating hearth so that the furnace and thus the material introduced thereinto are directly heated.

The resulting coke B which has a specific surface area of for example for 150 to 200 m$^2$/g contains about 95% of the C$_{fix}$ of the brown coal introduced. It is passed to a grading device 5 in which fine-grain material B2, which has for example a grain size of less than 1 mm, is screened out. The material B1 which passes over the screen in the device 5 and which may have a grain size of for example from 1 to 6 mm, is introduced into an activation reactor 6. In the embodiment illustrated in FIG. 2, the coke is transported from the hearth-type furnace 3 by way of the grading device 5 into the activation reactor 6 without a special intermediate cooling step, so that the coke introduced into the activation reactor 6 is at a temperature which is only a little less than the temperature at which the coke left the furnace 3. In this way, when the coke enters the activation reactor 6, it may be at a temperature which is from 800° to 900° C., assuming that the furnace 3 is operated at a temperature in the range between 1100° and 1300° C. In order to maintain favourable activation conditions, the operation of transporting the material from the furnace 3 into the activation reactor 6, and the intermediate operation of grading, should be carried out under inert conditions or at least under conditions which make it difficult for oxidation to occur. It will be appreciated that operation can also be in such a way that all the coke B coming from the furnace 3, as shown in broken lines in FIG. 2, is passed directly into the activation reactor 6, without grading, in which case the temperature of the coke at its entry into the activation reactor 6 will be somewhat higher, because of the lower heat losses.

Activation of the coke is in essence effected by partial reaction thereof with water vapour and carbon dioxide, forming CO and H$_2$. The heat requirement which is necessary for these endothermic reactions is taken from the waste gas C of the furnace 3. A part C1 of the waste gas flow C, the temperature of which can be at about 1200° C., is used for indirect heating of the activation reactor 6. Another part C2 of the waste gas flow C is passed in counter-flow to the coke B1 fed into the reactor 6, that is to say, upwardly through activation chamber 15 of the activation reactor 6, to act as an activation gas. This counter-flow of waste gas C is at a temperature which is at about 900° C. so that this flow of gas also contributes to meeting the heat requirement of the activation reactor 6. The waste gas D from the activation chamber 15, which is enriched with CO and H$_2$ by the activation process, is passed to a waste-heat boiler 7 together with the flow C1 after leaving the activation reactor 6. The combustible components of the gas supplied to the waste-heat boiler 7 are completely burnt therein. In this case, in dependence on the total amount of gas produced in the furnace 3, it is possible for a further portion C2 of the waste gas flow C to be passed from the furnace 3 to the waste-heat boiler 7 directly, that is to say, without any intermediate use.

A portion E1 of the vapour produced in the waste-heat boiler 7 can be introduced into the activation reactor 6 as an activation agent, in mixture with the waste gas flow C1, or possibly alone. Whether and to what extent use is made of this, substantially depends on the amount and the composition of the waste gas C from the furnace 3 and whether adjustment thereto is required. Another portion E2 of the vapour produced in the waste-heat boiler 7 is passed through a turbine 8 which serves to produce electrical energy K. Exhaust vapour E2 from the turbine 8 may be used for heating the drier 1. The waste gas L from the waste-heat boiler 7 passes through an electrical or electrostatic precipitator filter 9 before it reaches atmosphere.

The activated coke F leaving the activation reactor 6 has a specific surface area which may be more than twice that of the coke B leaving the furnace 3 and may be for example of the order of magnitude of 550 m$^2$/g. After leaving the activation reactor 6, the activated coke F is passed to a cooling system 10 in which the coke is cooled by indirect cooling by means of water M and direct cooling by air N, and aged. The latter operation is effected by partial oxidation of the outer surface of the coke and is used in particular to avoid self-ignition of the coke when stored over a prolonged period. The now cooled and artificially aged active coke F is passed on to a grading device 11 in which it is divided into three fractions F1, F2 and F3.

The fine-grained fraction B2 of the coke B coming from the furnace 3, being the fraction which is separated out in the grading device 5, is also passed through the device 10 which is provided with two parallel but separate conveyor paths and conveyor devices for the coke flows F and B2, for the purposes of cooling and artificial ageing. After cooling of the fraction B2, the fraction B2 passes on to a grading device 12 in which it is divided into three fine-grain coke fractions B3, B4 and B5. This fine coke can be used for example in the metal processing and/or chemical industry, for example as sintering fuel.

It will be appreciated that the above-described method and apparatus are not restricted to processing coal such as brown coal with a grain size of from 0 to 10 mm. On the contrary, coarser material can also be treated, whether it is alone or in mixture with the above-mentioned fraction. Thus, the hearth-type furnace can be fed with broken briquette material such as broken brown coal briquettes, which are obviously not passed through the tubular drier 1 as a preliminary step of the method. It is also possible for a device 13 shown in FIG. 2 for producing shaped coke pieces such as briquettes or pellets to be associated with the above-described apparatus, which briquettes or pellets can be produced with or without a binding agent. Such coke briquettes or pellets (referenced 0 in FIG. 2) may also be introduced into the activation reactor 6, possibly in mixture with the coke B1 from the hearth-type furnace. As normally there is in any case an excess of waste gas in the furnace 3, no additional means and agents for heating the activation reactor 6 or for activation therein are required for the activation of any additional amounts of coke which may be introduced into the apparatus from the outside.

This also applies when the apparatus is additionally used for the re-activation of charged active coke G. The active coke can be fed to the hearth-type furnace 3, wherein, together with the brown coal fraction A1, it undergoes within the furnace 3 a thermal treatment which causes the substances which represent the charge on the coke and which have accordingly destroyed or reduced its adsorption capacity, to be degassed and possibly partially vaporised; the gaseous products which are formed in this way are burnt in the hearth-type furnace and therefore additionally serve to heat the furnace. However, these operations will normally have the result that carbon and possibly other solid degasification or vaporisation residues are deposited on the coke, and these tend to result in a reduction in the surface area. Consequently, it is also necessary in this case for the coke which has been treated in the furnace 3 to be activated, together with the coke produced from the brown coal A1, in the activation reactor 6, in the manner already described hereinbefore.

It is also possible for the charged active coke G to be supplied to the activation reactor 6 directly, that is to say, without preliminary thermal treatment in the hearth-type furnace 3. The particular circumstances, in particular the nature of the substances which are absorbed by the active coke, will determine which of these two possible forms of the coke re-activation will be employed.

Any dust or slurry which may possibly be produced when treating the charged active coke in the furnace 3 is screened out in the grading device 5 when separating out the fine-grained fraction B2 produced from brown coal, and passes, together with the fine-grained coke, into the fractions B3, B4 and B5; a higher price can be obtained for these fractions, than would be obtained when using the charged coke, simply as a fuel.

The substances which come from the charge on the active coke and which in many cases are noxious substances are burnt when fed to the hearth-type furnace 3, in the diffusion flame thereof, or, when the charged coke is fed directly into the activation reactor, such substances are burnt in the flame of the waste-heat boiler 7.

In an alternative form of the mode of procedure described with reference to the drawings, the coke from the hearth-type furnace 3 can be cooled before it is graded at 5 and passed into the activation reactor 6. It is also possible for the grading device 5 to be completely omitted and for all the coke to be passed into the activation reactor 6 without any intermediate grading operation. It will be appreciated that it will normally be more economical for the coke from the hearth-type furnace 3 to be passed into the activation reactor 6 with the lowest possible heat loss, that is to say, without any intermediate cooling.

The vapours from the cooling and ageing device 10, which normally also contain considerable amounts of dust, may also be passed into the waste-heat boiler 7 so that the combustible components of such vapours can also be put to use as fuel.

In another form of the above-described mode of operation, it is also possible for the coke from the hearth-type furnace 3 to be fed into the activation reactor 6 only after intermediate cooling has occurred. This mode of operation may be considered when all the coke B is passed through the cooling and ageing device 10, as in the event of a breakdown in the grading device 5. In this case, the fraction B5 can be passed into the activation reactor 6, as shown in broken lines in the drawing.

It has already been mentioned that one of the advantages of the method according to the invention is that it is very flexible in respect of its use. Thus, it is possible for coke B from the hearth-type furnace to be mixed with the activated coke F and used as a mixture. This can be effected for example by a coarser fraction, for example F1, of the activated coke, being mixed with one of the finer fractions, for example B3, of the unactivated coke. In this way the coke to be used can be adapted to any physical and cost requirements which may arise in practice, the cheapness of the unactivated fine coke obviously being of particular significance.

It will be seen from the foregoing that the method and apparatus of the invention can be made more economical and cost-effective, insofar as the energy which is produced in the individual method steps is generally used as extensively as possible, irrespective of the form in which it occurs, so that no additional energy or only a small amount of additional energy has to be supplied from outside. In addition, the charged adsorption coke is also re-activated, by substantially utilising the energy which is already available within the overall method.

It will be appreciated that many modifications and variations may be made in the above-described method and apparatus without thereby departing from the spirit and scope of this invention.

What is claimed is:

1. A method of producing active coke by thermal treatment of coal-base feed material, comprising coking the feed material in a hearth-type furnace, feeding at least a portion of the resulting coke of the desired grain size into an activation reactor, passing at least a portion of the waste gas from the hearth-type furnace into the activation reactor as an activation gas, and passing the hot waste gas from the activation reactor into a waste-heat boiler.

2. A method as set forth in claim 1 wherein a portion of the waste gas is also used as a heating gas.

3. A method as set forth in claim 1 wherein the coke from the hearth-type furnace is passed directly into the activation reactor without intermediate cooling.

4. A method as set forth in claim 1 wherein the activated coke from the activation reactor and a portion of coke which has not been subjected to treatment in the activation reactor are cooled and vapours produced thereby are used in the waste-heat boiler.

5. A method as set forth in claim 1 wherein a portion of coke which has not been subjected to treatment in the activation reactor is cooled and vapors produced thereby are used in the waste-heat boiler.

6. A method as set forth in claim 1 wherein residual waste gas from the hearth-type furnace is utilised in the waste-heat boiler.

7. A method as set forth in claim 1 wherein a portion of the vapour produced in the waste-heat boiler is used for adjustment of the composition of the activation gas.

8. A method as set forth in claim 1 wherein said coal-based feed material includes charged active coke which is additionally introduced into the hearth-type furnace for re-activation of the coke.

9. A method as set forth in claim 1 wherein said coal-based feed material is brown coal.

10. A method as set forth in claim 1 wherein charged active coke is additionally introduced directly into the activation reactor for re-activation of the coke.

* * * * *